United States Patent
Moniruzzaman et al.

(10) Patent No.: US 12,141,696 B2
(45) Date of Patent: Nov. 12, 2024

(54) SYSTEM AND METHOD FOR WELL INTERFERENCE DETECTION AND PREDICTION

(71) Applicant: RS Energy Group Topco, Inc., Calgary (CA)

(72) Inventors: Md Moniruzzaman, Bellevue, WA (US); Manuj Nikhanj, Calgary (CA); Livan B. Alonso, Wayne, PA (US); Daniel Rieman, Philadelphia, PA (US)

(73) Assignee: RS Energy Group Topco, Inc., Calgary (CA)

( * ) Notice: Subject to any disclaimer, the term of this patent is extended or adjusted under 35 U.S.C. 154(b) by 0 days.

(21) Appl. No.: 18/133,862

(22) Filed: Apr. 12, 2023

(65) Prior Publication Data

US 2023/0252290 A1   Aug. 10, 2023

Related U.S. Application Data

(63) Continuation of application No. 16/867,480, filed on May 5, 2020, now Pat. No. 11,704,557.

(Continued)

(51) Int. Cl.
*G06N 3/08* (2023.01)
*G06F 16/28* (2019.01)
(Continued)

(52) U.S. Cl.
CPC ............ *G06N 3/08* (2013.01); *G06F 16/288* (2019.01); *G06F 16/9024* (2019.01); *G06N 3/04* (2013.01)

(58) Field of Classification Search
CPC ............ G06N 3/08; G06N 3/04; G06N 3/045; G06F 16/288; G06F 16/9024; G06F 16/901; E21B 2200/22; E21B 43/00
See application file for complete search history.

(56) References Cited

U.S. PATENT DOCUMENTS 8,374,974 B2 * 2/2013 Chen ................ G06F 18/10 706/8
9,501,740 B2 * 11/2016 Hiu ................ G06N 3/08
(Continued)

FOREIGN PATENT DOCUMENTS

| WO | 2017/139271 A2 | 8/2017 |
|---|---|---|
| WO | 2018/067131 A1 | 4/2018 |
| WO | 2018/132786 | 7/2018 |

OTHER PUBLICATIONS

Extended European Search Report dated May 8, 2023, of counterpart European Patent Application No. 20802198.0.
International Preliminary Report on Patentability from corresponding PCT International Application No. PCT/US2020/031530 dated Nov. 18, 2021.
(Continued)

*Primary Examiner* — Angelica Ruiz
(74) *Attorney, Agent, or Firm* — DLA Piper LLP (US)

(57) ABSTRACT

Systems and methods for generating an interference prediction for a target well are disclosed herein. A computing system generates a plurality of interference metrics for a plurality of interference events. For each well, the computing system generates a graph based representation of the well and its neighboring wells. The computing system generates a predictive model using a graph-based model by generating a training data set and learning, by the graph-based model, an interference value for each interference event based on the training data set. The computing system receives, from a client device, a request to generate an interference prediction for a target well. The computing system generates, via the predictive model, an interference metric based on the one or more metrics associated with the target well.

20 Claims, 8 Drawing Sheets

Related U.S. Application Data

(60) Provisional application No. 62/843,774, filed on May 6, 2019.

(51) Int. Cl.
*G06F 16/901* (2019.01)
*G06N 3/04* (2023.01)

(56) References Cited

U.S. PATENT DOCUMENTS

| | | | |
|---|---|---|---|
| 10,942,293 B2* | 3/2021 | Wiener | G01V 1/147 |
| 11,072,006 B2* | 7/2021 | Campanella | E21B 43/00 |
| 2006/0193205 A1 | 8/2006 | Herkenhoff et al. | |
| 2007/0016389 A1 | 1/2007 | Ozgen | |
| 2010/0114544 A1 | 5/2010 | Dogru | |
| 2016/0281497 A1 | 9/2016 | Tilke et al. | |
| 2018/0335538 A1 | 11/2018 | Dupont et al. | |
| 2019/0107642 A1 | 4/2019 | Farhadi Nia et al. | |
| 2019/0179983 A1 | 6/2019 | Prochnow et al. | |

OTHER PUBLICATIONS

Cipolla, Craig et al., "Integrating Microseismic, Geomechanics, Hydraulic Fracture Modeling, and Reservoir Simulation to Characterize Parent Well Depletion and Infill Well Performance in the Bakeen", Unconventional Resources Technology Conference, URTeC: 2899721, 2018.

Kumar, Ashish, et al., "Well Interference Diagnosis through Integrated Analysis of Tracer and pressure Interference Tests", Unconventional Resources Technology Conference, URTeC: 2301827, 2018.

Guo, Xuyang et al., "Understanding the mechanism of interwell fracturing interference based on reservoir-geomechanics-fracturing modeling in Eagle Ford Shale", Unconventional Resources Technology Conference, URTeC: 2874464, 2018.

International Search Report and Written Opinion from corresponding PCT International Application No. PCT/US2020/031530 dated Aug. 3, 2020.

Examination Report from corresponding Canadian Patent Appln. No. 3,139,113 dated Apr. 8, 2024.

* cited by examiner

SYSTEM AND METHOD FOR WELL INTERFERENCE DETECTION AND PREDICTION

FIELD OF DISCLOSURE

The present disclosure generally relates to a method and a system for well interference detection and prediction.

BACKGROUND

In multi-well pads, hydraulic fractures of a well may enable communication with other near-by wells, which may influence the well's production performance. Such inter-well communication is known in the art as "well interference." Quantifying well interference may aid in optimizing well spacing, which may lead to higher productivity of a well field.

SUMMARY

Embodiments disclosed herein generally relate to a method and system for well interference detection and prediction. In some embodiments, a method of generating an interference prediction for a target well is disclosed herein. A computing system generates a plurality of interference metrics for a plurality of interference events for a plurality of wells using decline curve analysis based on historical production information for each well. For each well, the computing system generates a graph-based representation of the well and its neighboring wells. The computing system generates a predictive model using a graph-based model by generating a training data set that includes the plurality of interference metrics for the plurality of wells, well design, historical production information for each well, and a numerical representation of the graph based representation of each well and learning, by the graph-based model, an interference value for each interference event based on the plurality of interference metrics for the plurality of wells, the historical production information for each well, and the numerical representation of the graph based representation of each well. The computing system receives, from a client device, a request to generate an interference prediction for a target well. The request includes one or more metrics associated with the target well. The computing system generates, via the predictive model, an interference metric based on the one or more metrics associated with the target well.

In some embodiments, a method of generating an interference prediction model is disclosed herein. The computing system generates a plurality of interference metrics for a plurality of interference events for a plurality of wells using decline curve analysis based on historical production information for each well. The computing system generates a graph-based representation of the well and its neighboring wells for each well. The computing system generates a predictive model using a graph-based model by generating a training data set that includes the plurality of interference metrics for the plurality of wells, historical production information for each well, and a numerical representation of the graph based representation of each well and learning, by the graph-based model, an interference value for each interference event based on the plurality of interference metrics for the plurality of wells, historical production information for each well, and a numerical representation of the graph based representation of each well.

In some embodiments, a method of generating an interference prediction for a target well is disclosed herein. The computing system receives, by the computing system from a client device, a request to generate an interference prediction for a target well, the request comprising one or more metrics associated with the target well, the one or more metrics comprising geographical information for the target well. The computing system retrieves offset well information for the target well. Each offset well is a neighbor with the target well. The computing system inputs the one or more metrics and the offset well information into a graph-based model that is trained to generated well interference predictions. The graph-based model generates the well interference prediction for the target well based on the one or more metrics and the offset well information. The computing system outputs the well interference prediction for the target well.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

One or more techniques described herein generally relate to a system and method for predicting well interference. Conventional systems typically build multiple simulators, such as micro seismic, fluid injunction, fracture modeling, reservoir simulation, and the like to measure well interference. However, due to the complexity of these techniques, such approaches are often limited to only studying a few cases of wells. The one or more techniques improve upon conventional systems by building an interference detection model that may be scalable to large datasets.

The one or more methods describe herein may formalize how to quantify an offset well's interference based on the production performance of the parent well. For example, the techniques described herein may consider the uncertainty and noise in production data and propose metrics that reliably measure interference. Conventional systems lack such formal metrics that are specific to interference, and instead rely on a naïve approach of taking production difference.

To forecast production of a well, the present system may take into consideration interference events in the well's lifetime. While some events may significantly interfere with a well's production, many events may have almost no impact of a well. A production type curve of the well may be updated each time a significant event takes place. Such approach may aid in reducing error in production forecast, compared to single type curve based approaches. Such approach may also allow the system to measure long-term impact of interference events.

Another challenging problem in well interference is estimating production profiles of newly drilled wells with few data points. Such problem may be referred to as a cold start problem. The disclosed system addresses such issue through a combination of locality sensitivity hashing and dynamic time warping to identify a set of similar wells to infer production profiles of the new wells.

Further, the present system may leverage computational graph theory to model the relationship among wells within a field. Such approach may allow the system to obtain various graph metrics to generate well population density in an area and understand how communication may flow between wells. Such information may be used to train a machine learning model to predict interference ahead of time. This approach is a novel approach of predicting interference as it not only utilizes information about a given well-bore target, but also from its neighboring wells.

Figure 1:
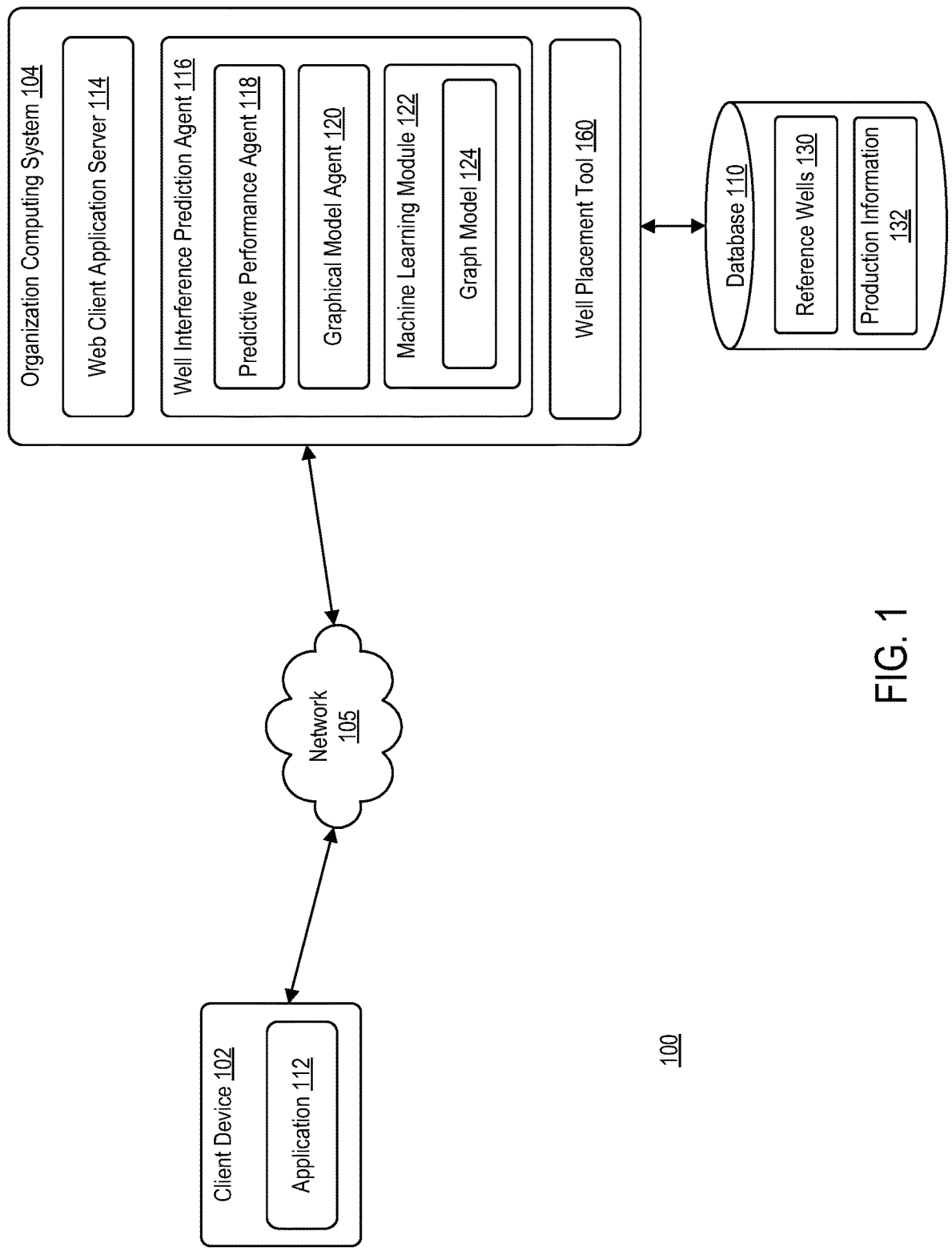
FIG. 1 is a block diagram illustrating a computing environment, according to example embodiments.

FIG. 1 is a block diagram illustrating a computing environment 100, according to example embodiments. Computing environment 100 may include one or more client devices 102, an organization computing system 104, and a database 106 communication via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™ ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of computing environment 100.

Client device 102 may be operated by a user. For example, client device 102 may be a mobile device, a tablet, a desktop computer, or any computing system having the capabilities described herein. Client device 102 may belong to or be provided to a user or may be borrowed, rented, or shared. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 102 may include at least application 112. Application 112 may be representative of a web browser that allows access to a website or a stand-alone application. Client device 102 may access application 112 to access functionality of organization computing system 104. Client device 102 may communicate over network 105 to request a webpage, for example, from web client application server 114 of organization computing system 104. For example, client device 102 may be configured to execute application 112 to access content managed by web client application server 114. The content that is displayed to client device 102 may be transmitted from web client application server 114 to client device 102, and subsequently processed by application 112 for display through a graphical user interface (GUI) of client device 102. For example, via application 112, client device 102 may access an interference prediction model hosted by organization computing system 104.

Organization computing system 104 may include at least web client application server 114 and well interference prediction agent 116. Well interference prediction agent 116 may be configured to predict interference for a given well based on an initial input provided by client device 102. Well interference prediction agent 116 may include a predictive performance agent 118, a graphical model agent 120, and a machine learning module 122. Each of predictive performance agent 118, graphical model agent 120, and machine learning module 122 may include one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather as a result of an instructions.

Predictive performance agent 118 may be configured to generate a metric to quantify well interference. Such metric may be used by machine learning module 122 to train a graph-based model to predict interference for a well. Generation such metric is a non-trivial task due to the noise in well production data.

Predictive performance agent 118 may be implement a shut-in period detection algorithm that utilizes anomaly detection techniques to identify a time period in which a target well is either shut-in or its production is impacted due to completion of offset wells. Anomaly detection may aid in tagging production data points that may deviate from the properties exhibited until the offset wells' completion. In some embodiments, predictive performance agent 118 may utilize an Anomaly Detection package implementing Seasonal Hybrid Extreme Studentized Deviate (SH-ESD algorithm for the task. Such completion of offset wells may be referred to as an interference event. In some embodiments, predictive performance agent 118 may be configured to identify multiple interference events.

In some embodiments, an interference event may also constitute a refracture event. A refracture event may interfere with the production of a well bore target. While a well operator may expect a refracture event to have a positive impact on a well bore target, the impact of the refracture event on neighboring wells is unknown.

For each interference event, predictive performance agent 118 may retrieve performance data for the target well both before and after the interference event. In some embodiments, predictive performance agent 118 may retrieve performance data from a third party data source. In some embodiments, predictive performance agent 118 may retrieve performance data from database 106. Predictive performance agent 118 may use performance data to generate a short-term interference metric and a long-term interference metric.

For the short-term interference metric, predictive performance agent 118 may generate a buffer-zone interference measures that establishes an expected production profile for a target well using Bayesian statistics. Predictive performance agent 118 may be configured to forecast future performance of a well (i.e., after a given interference event) based on production information prior to that interference event. Predictive performance agent 118 may be configured to forecast future performance of the well using one or more decline curve analyses. For example, predictive performance agent 118 may generate one or more decline curves using Arps Equations. In other examples, predictive performance agent 118 may generate one or more decline curves using one or more of Bayesian probabilistic decline curve analysis, Fetkovich, Blasingame and Agarwal-Gardner type curve methods, Duong decline curve model, stretched exponential decline, multi-segment decline model, power law decline, logistic growth model, Gringarten type curve analysis, Wattenbarger type curve analysis, or any suitable type of method. Predictive performance agent 118 may determine an amount of interference caused by the interference event by comparing the points on the decline curve to the actual performance values that are outside the expected production profile of the target well.

In some embodiments, interference events that improve production in the short-term may not always guarantee increase in productivity over the long-term. Accordingly, predictive performance agent 118 may generate an estimated ultimate recovery (EUR) based interference metric that may capture the long-term effect of the interference event. Predictive performance agent 118 can be configured to forecast future long-term performance of a well based on production information after the interference event. Predictive performance agent 118 may be configured to forecast future performance of the well using one or more decline curve analyses. For example, predictive performance agent 118 may generate one or more decline curves using Arps Equations. In other examples, predictive performance agent 118 may generate one or more decline curves using one or more of Bayesian probabilistic decline curve analysis, Fetkovich, Blasingame and Agarwal-Gardner type curve methods, Duong decline curve model, stretched exponential decline, multi-segment decline model, power law decline, logistic growth model, Gringarten type curve analysis, Wattenbarger type curve analysis, or any suitable type of method. Predictive performance agent 118 may determine an amount of interference caused by the interference event by comparing the points on the decline curve (i.e., the expected performance values) to the points of the post-event type curve values of the target well.

Because the production information associated with a target well may be sparse due to segmented information from multiple interference events (e.g., first set of production information—first interference event—second set of production information—second interference event—etc.), there may not be enough data points in a time frame to establish an expected production profile and production forecasting. Accordingly, in such embodiments, predictive performance agent 118 may leverage a plurality or reference wells that are drilled in a similar geological area with similar completion strategy and production performance.

An exemplary embodiment of a play may be a grouping of wells or oil fields within a specific location or region that may be controlled by the same set of geological or geographical circumstances. A further exemplary embodiment of a play may also refer to a geologic setting, such as a stratigraphic or structural geologic setting. A still further exemplary embodiment of play may be a broad category of possible geographic areas with hydrocarbon potential. In some embodiments, when a play may contain a large population of wells, the process of finding similar reference wells may occupy many computer resources. Accordingly, predictive performance agent 118 may reduce such processing requirements by choosing an approximate nearest neighbor search algorithm, such as locality sensitive hashing, which may have the ability to scale as the dataset grows. Locality sensitive hashing (LSH) may organize records into different buckets such that two records that are similar in terms of a metric end up in the same bucket. LSH may apply several hash functions to create signature representations of different subsets of columns in the dataset. Records that end up in many buckets across hash functions may be considered as candidate similar records. Candidate records may then be compared to find records closest to a given record. LSH optimizes runtime by selectively comparing records. Another challenge in finding similar reference wells is that two production profiles may be similar but may also be shifted in time axis (e.g., showing similarities starting in different producing months). Accordingly, predictive performance agent 118 may apply a dynamic time warping algorithm which allows predictive performance agent to find similar production profiles by performing an optimal (or near-optimal) mapping between two production time series. Accordingly, once the reference wells are identified, predictive performance agent 118 may use such data points to aid in producing the interference metric via decline curve analysis.

Graphical model agent 120 may be configured to generate a graph-based model of an area containing a target well (e.g., the target well analyzed by performance prediction agent 118 when generating the interference metrics). Such graph-based model may illustrate the inter-well relationship in the area. For example, graphical model agent 120 may abstract away detail information about neighboring wells for a target well with a summarized view that may be relevant to estimate interference. Graphical model agent 120 may determine whether two wells should be connected in a graph based on spacing information and time of completion information. In addition, offset wells closer to the target well may be weighted more heavily, as compared to those offset wells that are farther away from the target well (e.g., neighbors' neighbors).

In some embodiments, after graphical model agent 120 generates a model of a given area centered about the target well, graphical model agent 120 may translate the graphical model to a matrix-representation. For example, each row in a matrix may represent a given well and each column may represent an offset well. The value in a given element of the matrix may represent whether two wells are connected. For example, a 1 may represent that two wells are connected and a 0 may represent that two wells are not connected.

In some embodiments, machine learning module 122 may implement a graph model for semi-supervised learning. Machine learning module 122 may include graph model 124. Graph model 124 may be representative of graph-based learning model. In some embodiments, graph model 124 may be representative of a graph neural network model. Exemplary graph neural network models may include, but are not limited to, graph convolutional networks and other graph-based models, such as a graph auto-encoder. In some embodiments, graph model 124 may be representative of a graph kernel.

Machine learning module 122 may be configured to train graph model 124 to predict well interference based at least on the production profile of target wells and offset well information. In some embodiments, training information may further include well design, geological information, completion strategy, tracer observation and pressure information when available. In some embodiments, graph model 124 may include two hidden layers of neurons that perform one or more rounds of information propagation. After the first round, a well may receive information about its neighboring offset wells. After the second round, the well may receive information about the neighbors of its neighbors. As those skilled in the art may readily understand, additional rounds of information propagation may be performed for wider coverage on the graph. In some embodiments, machine learning module 122 may implement PageRank and XGBoost models for some areas (e.g., plays).

In some embodiments, such as when graph model 124 is a graph autoencoder, graph model 124 may identify a neighborhood (i.e., a number of nodes within a given number of steps) around a target well node and encode information about the neighborhood into a matrix form. In some embodiments, increasing the neighborhood around the target node may lead to a broader view of the network of wells surrounding the target well.

In some embodiments, such as when graph model 124 is a graph kernel, graph model 124 may perform various operations on the neighborhood around a target well. For example, increasing the size of the neighborhood may provide a broader view of information that is potentially relevant to further analyses or predictions.

Database 106 may include one or more reference wells 130 and production information 132. The reference wells may be stored according to one or more characteristics of the well. As illustrated, the one or more reference wells of reference group 130 may be stored according to shape, play, sub-play, region, operator, interval, completion, or any other suitable set of criteria.

Production information 132 may correspond to production information for each well. Such production information may include oil, gas and barrel of oil equivalent (BOE) indexed by the producing month.

In some embodiments, organization computing system 104 may further include well placement tool 160. Well placement tool 160 may be configured to leverage multiple modules to provide a visual display of the optimal layout for a development plan. For example, well placement tool 160 may utilize output from machine learning module 122 to aid in generating an optimal layout for the development plan. Well placement tool 160 may, for example, be configured to generate one or more wellbore paths for a target wellbore based on two or more data points associated with two or more data points for the target wellbore.

In some embodiments, well placement tool 160 may provide information on any well-to-well communication and inform end users of the impact of tighter spacing and completion designs on the proposed well placement layout. In some embodiments, in determining whether a layout is "optimal," well placement tool 160 may consider various factors such as, but not limited to, well spacing, well completion design, and economics information. Well placement tool 160 may combine these various factors into a single score that may be used to rank different well placement strategies. In some embodiments, well placement tool 160 may further consider interference predictions generated by machine learning module 122 when generating a well placement score. Considering well interference, in addition to the various factors discussed above, would allow spacing of wells in such a way that would prevent large negative impacts on existing wells. For example, in an area where there may be existing wells and in which an operator wishes to develop further, well placement tool 160 may consider well interference predictions, which may lead to a more accurate measure of well performance by taking inter-well communication into account. As such, incorporating well interference metrics into the development plan may allow for a more accurate calculation of net present value (NPV).

In a typical workflow for well placement in a development plan, several parameters may be provided as input to well placement tool 160 for wells are planned to be drilled. In some embodiments, such parameters may include, but are not limited to, geological information, existing well information, and planned completion strategies. Well placement tool 160 may leverage well interference prediction agent 116 to estimate potential interference among the wells. The potential interference information may be used by well placement tool 160 to adjust the wells' performance forecast and evaluate economics. In some embodiments, well placement tool 160 may repeat the workflow multiple times to reach the placement strategy that maximizes the NPV.

Figure 2:
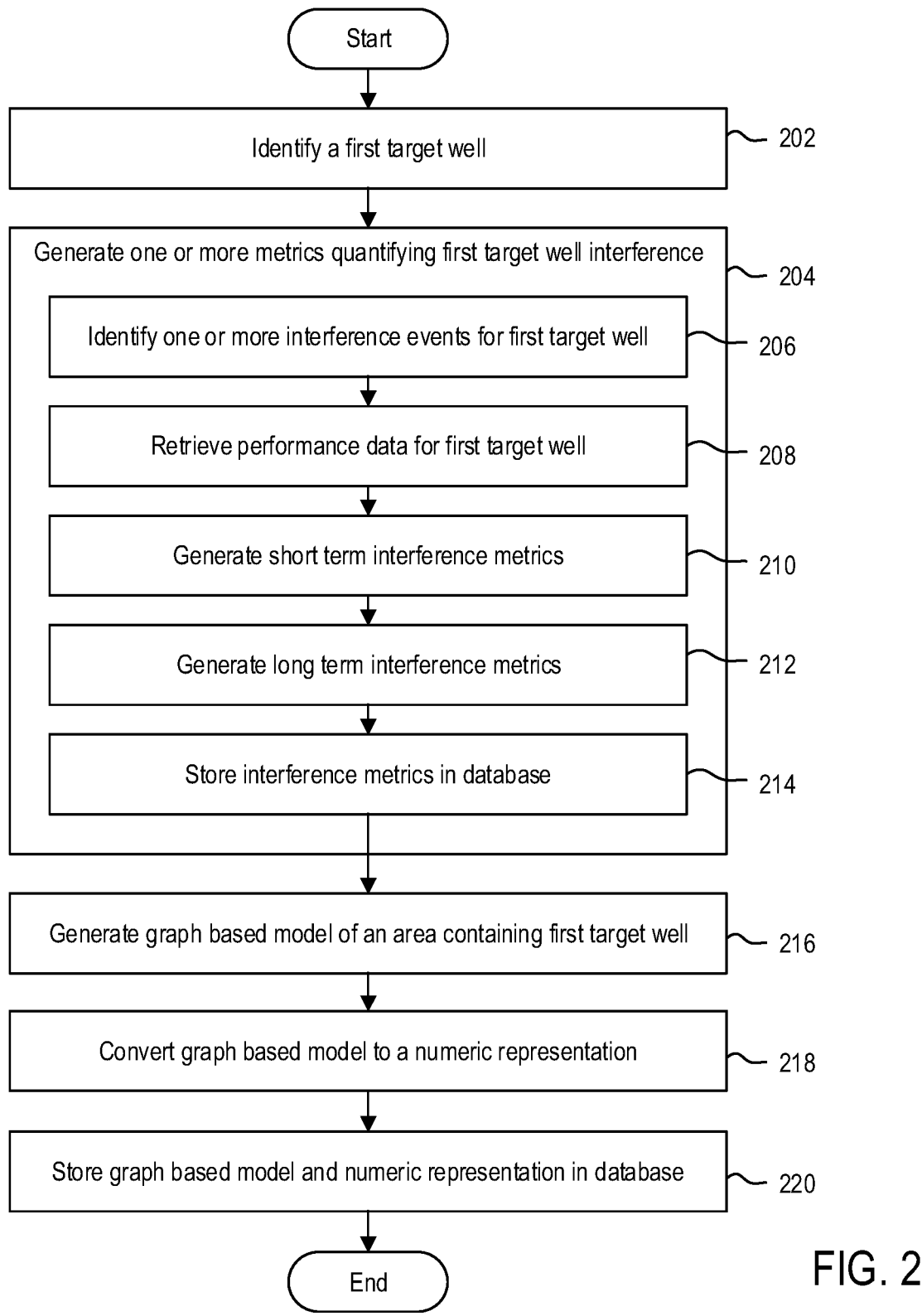
FIG. 2 is a flow diagram illustrating a method of generating a training data set, according to exemplary embodiments.

FIG. 2 is a flow diagram illustrating a method 200 of generating a training data set, according to exemplary embodiments. Method 200 may begin at step 202.

At step 202, well interference prediction agent 116 may be configured to identify a first target well. For example, well interference prediction agent 116 may select a first target well among a plurality of target wells, for which to generate interference metrics. Although the following discussion focuses on a single target among a plurality of target wells, those skilled in the art may readily understand that such processes may be performed on subsequent target wells to generate a sufficient training set for graph-based models.

At step 204, well interference prediction agent 116 may generate one or more metrics to quantify well interference. Step 204 may include one or more sub-steps 206-212.

At sub-step 206, predictive performance agent 118 may identify one or more interference events during the lifetime of the target well. For example, predictive performance agent may implement a shut-in period detection algorithm that utilizes anomaly detection techniques to identify one or more time periods in which the target well is either shut-in or its production has been impacted due to completion of offset wells.

In some embodiments, predictive performance agent 118 may quantify an impact of recompletion or refracture on the target well. In some embodiments, predictive performance agent may detect and quantify the impact of the recompletion or refracture interference event on that target well's neighbors. In other words, predictive performance agent 118 may treat the recompletion or refracture event as if it was a new neighbor well.

At sub-step 208, predictive performance agent 118 may retrieve performance data for the target well. For example, for each interference event, predictive performance agent 118 may retrieve performance data for the target well both before and after the interference event. In some embodiments, predictive performance agent 118 may retrieve performance data from a third-party data source. In some embodiments, predictive performance agent 118 may retrieve performance data from database 106. In some embodiments, predictive performance agent 118 may quantify the impact of a recompletion or refracture interference event on the target well and add that information to the data set.

At sub-step 210, predictive performance agent 118 may generate a short-term interference metric for each interference event. For example, predictive performance agent 118 may generate a short-term buffer-zone to establish an expected production profile for a target well using Bayesian statistics. Predictive performance agent 118 may be configured to forecast future performance of a well (i.e., after a given interference event) based on production information prior to that interference event. Short-term interference measures may be calculated by comparing production data points falling outside the expected production profile with the forecasted future performance. Predictive performance agent 118 may be configured to forecast future performance of the well using one or more decline curve analyses. For example, predictive performance agent 118 may generate one or more decline curves using Arps Equations. Predictive performance agent 118 may determine an amount of interference caused by the interference event by comparing the points on the decline curve (i.e., the expected performance values) to the actual performance values of the target well.

As discussed above, in some embodiments, the production information associated with a target well may be sparse due to how production time series may be segmented by the multiple interference events. Accordingly, in some embodiments, step 210 may include leveraging a plurality of reference wells using a combination of locality sensitivity hashing and dynamic time warping to identify reference wells that are drilled in a similar geological area with similar completion strategy and production performance as the target well to obtain more data points for a more robust decline curve analysis.

At sub-step 212, predictive performance agent 118 may generate a long-term interference metric for each interference event. For example, predictive performance agent 118 may generate an EUR-based interference metric that may capture the long-term effect of the interference event. Predictive performance agent 118 may be configured to forecast future long-term performance of a well based on production information after the interference event. Predictive performance agent 118 may be configured to forecast future performance of the well using one or more decline curve analyses. For example, predictive performance agent 118 may generate one or more decline curves using Arps Equations. Predictive performance agent 118 may determine an amount of interference caused by the interference event by comparing the points on the decline curve (i.e., the expected performance values) to the actual performance values of the target well. EUR-based interference may be calculated by comparing the decline curve generated with production data before and after the interference event.

As discussed above, in some embodiments, the production information associated with a target well may be sparse due to how segmented the data is from multiple interference events. Accordingly, in some embodiments, step 212 may include leveraging a plurality of reference wells using a combination of locality sensitivity hashing and dynamic time warping to identify reference wells that have a similar geology, completion strategy and production performance as the target well to obtain more data points for a more robust decline curve analysis.

At sub-step 214, predictive performance agent 118 may store the short-term and long-term interference metrics for the target well in database 106. For example, predictive performance agent 118 may store the short-term and long-term interference metrics for the target well in database 106 as a comma separated value (CSV) file.

At step 216, well interference prediction agent 116 may generate a graph-based model of an area containing the target well. For example, graphical model agent 120 may generate a graph-based model that illustrates the inter-relationship among the target well and a plurality of off-set wells in a particular area (e.g., a particular play, sub-play, etc.). Graphical model agent 120 may abstract away detail information about neighboring wells for a target well with a summarized view that may be relevant to estimate interference. Graphical model agent 120 may determine whether two wells should be connected in a graph based on spacing information and time of completion information. Offset wells that are closer to the target well may be weighted more heavily, as compared to those offset wells that are farther from the target well (e.g., neighbors' neighbors).

At step 218, well interference prediction agent 116 may convert the graph-based model of the area contained the target well to a numeric representation. For example, after graphical model agent 120 generates a model of a given area centered about the target well, graphical model agent 120 may translate the graphical model to a matrix-representation. In some embodiments, each row in a matrix may represent a given well and each column may represent an offset well. The value in a given element of the matrix may represent whether two wells are connected. In some embodiments, a 1 may represent that two wells are connected and a 0 may represent that two wells are not connected.

At step 220, well interference prediction agent 116 may store the graph-based model and the numerical representation of the model in database 106.

Figure 3:
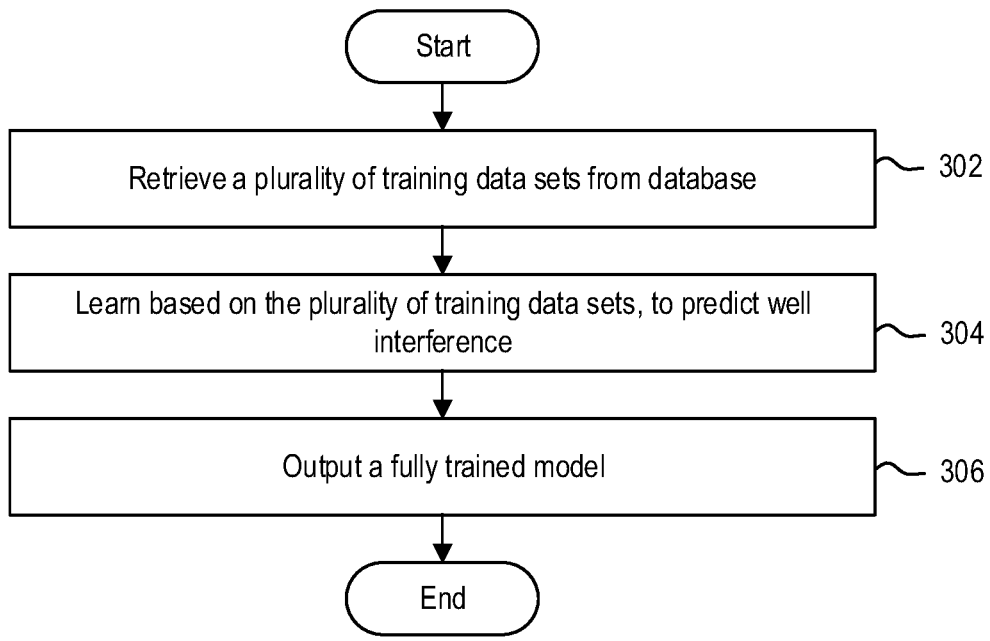
FIG. 3 is a flow diagram illustrating a method of training graph-based model, according to example embodiments.

FIG. 3 is a flow diagram illustrating a method 300 of training a prediction model (e.g., graph model 124), according to example embodiments. Method 300 may begin at step 302.

At step 302, well interference prediction agent 116 may retrieve a plurality of training data sets from database 106. In some embodiments, the plurality of training data sets may include interference metrics (both short-term and long-term) for a plurality of target wells and numerical representations of the relationship of each target well with a plurality of offset wells. In other words, the plurality of training data sets may include a CSV file of short-term interference metrics and long-term interference events, and a matrix based representation of a target well's relationship with offset wells in a given area (e.g., play, sub-play, etc.).

At step 304, well interference prediction agent 116 may learn, based on the plurality of training data sets, to predict well interference given one or more inputs related to a well. For example, machine learning module 122 may be configured to train graph model 124 to predict well interference based at least on the completion information of target wells and offset well information. In some embodiments, the training set may further include a numeric representation of the target well with respect to its offset wells. In some embodiments, graph model 124 may include two hidden layers of neurons that perform one or more rounds of information propagation. After the first round, a well may receive information about its surrounding neighboring wells. After the second round, the well may receive information about the neighbors of its neighbors. As those skilled in the art may readily understand, additional rounds of information propagation may be performed for wider coverage on the graph. In some embodiments, machine learning module 122 may implement PageRank and XGBoost models for some areas (e.g., plays).

In some embodiments, such as when graph model 124 is a graph autoencoder, graph model 124 may identify a neighborhood (i.e., a number of nodes within a given number of steps) around a target well node and encode information about the neighborhood into a matrix form. In some embodiments, increasing the neighborhood around the target node may lead to a broader view of the network of wells surrounding the target well.

In some embodiments, such as when graph model 124 is a graph kernel, graph model 124 may perform various operations on the neighborhood around a target well. For example, increasing the size of the neighborhood may provide a broader view of information that is potentially relevant to further analyses or predictions.

Machine learning module 122 may compare each interference prediction generated by graph model 124 to the actual, known, interference metric associated with each well. In some embodiments, machine learning module 122 may minimize the root mean squared error between the predicted value and the actual value utilizing an optimization algorithm such as Adaptive Moment Estimation (Adam) optimization which is a variation of Stochastic Gradient Descent method.

At step 306, well interference prediction agent 116 may output a fully trained model. For example, after the training process, graph model 124 may be configured to receive information directed to a target well due to the planned drilling of an offset well, for which interference information is not yet known. graph model 124 may be configured to predict one or more interference metrics for the given well based on, for example, one or more metrics associated with the well. Exemplary metrics may include, for example, completion information of the target well, geological information associated with the area in which the target well lays, potential offset well information, and the like.

Figure 4:
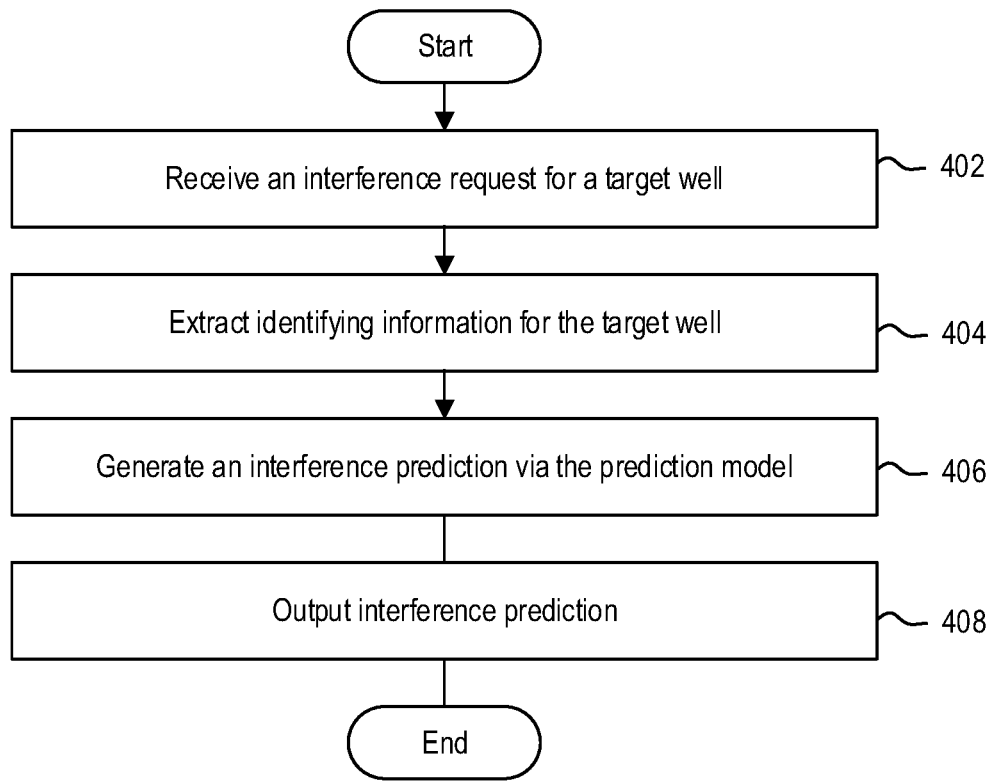
FIG. 4 is a flow diagram illustrating a method of generating an interference prediction, according to example embodiments.

FIG. 4 is a flow diagram illustrating a method 400 of generating an interference prediction, according to example embodiments. Method 400 may begin at step 402.

At step 402, well interference prediction agent 116 may receive an interference request for a target well. For example, well interference prediction agent 116 may receive the interference request from client device 102 executing application 112. Via application 112, client device 102 may upload information associated with the interference request. Such information may include, for example, one or more of a location of a target well, geological information associated with an area in which the target well is located, completion information associated with the target well, offset well information associated with the target well, production and completion information associated with each offset well, and the like.

At step 404, well interference prediction agent 116 may extract the information from the request. For example, well interference prediction agent 116 may extract one or more of a location of a target well, geological information associated with an area in which the target well is located, any production information associated with the target well, offset well information associated with the target well, production information associated with each offset well from the request received from client device 102. In some embodiments, well interference prediction agent 116 may format such information prior to input to graph model 124. For example, in some embodiments, well interference prediction agent 116 may normalize the information, and format the information into a CSV file. In another example, graphical model agent 120 may generate a graphical representation of the target well's relationship with offset wells. Graphical model agent 120 may then convert the graphical representation to a numerical representation (e.g., a matrix-based representation.)

At step 406, well interference prediction agent 116 may generate an interference prediction based on the extracted information. For example, well interference prediction agent 116 may input the normalized and formatted data set into a fully-trained graph model 124 such that graph model 124 may output the interference prediction. During a first round of information propagation, graph model 124 may generate the target well's relationship to its surrounding neighbors. During a second round of information propagation, graph model 124 may generate each surrounding well's relationship to their respective neighbors. As those skilled in the art may appreciate, additional rounds of information propagation may be needed for wider coverage of neighbors, depending on the breadth of input data provided by client device 102. In some embodiments, the interference prediction may include a predicted change in the target well's production given a recompletion data and completion strategy (e.g., proppant mass, fluid volume, number of stages used to recomplete the target well, etc.). In some embodiments, the interference prediction may include metrics directed to how a recompletion or refracture interference event impacts a target well's neighbors and by how much.

At step 408, well interference prediction agent 116 may output the prediction for client device 102. For example, well interference prediction agent 116 may generate a web page or a portal through which a user may view the interference metrics associated with the prediction. The portal may include various statistics for easy interpretation of the interference metrics.

Figure 5A:
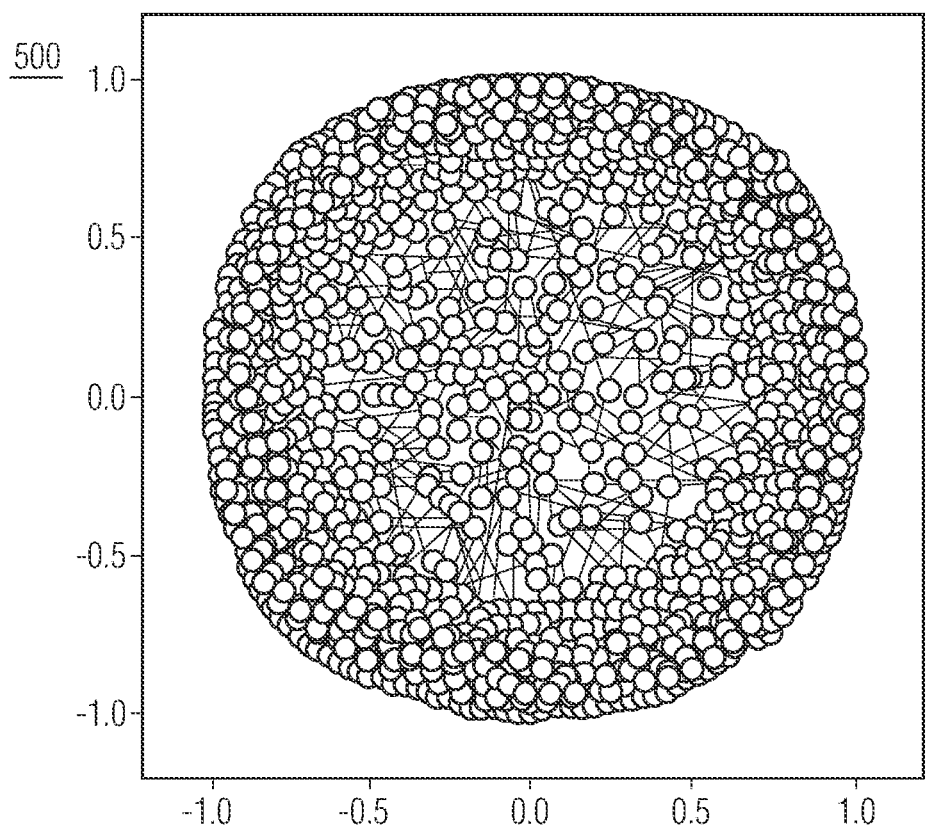
FIG. 5A is a block diagram illustrating a graph-based representation of target wells and their offset wells, according to example embodiments.

FIG. 5A is a block diagram illustrating a graph-based representation 500 of target wells and their offset wells, according to example embodiments. As illustrated, each node represents a well in a given location. A directed edge between two nodes may represent a parent-child (in other words, target well—offset well) relationship between the two wells.

Figure 5B:
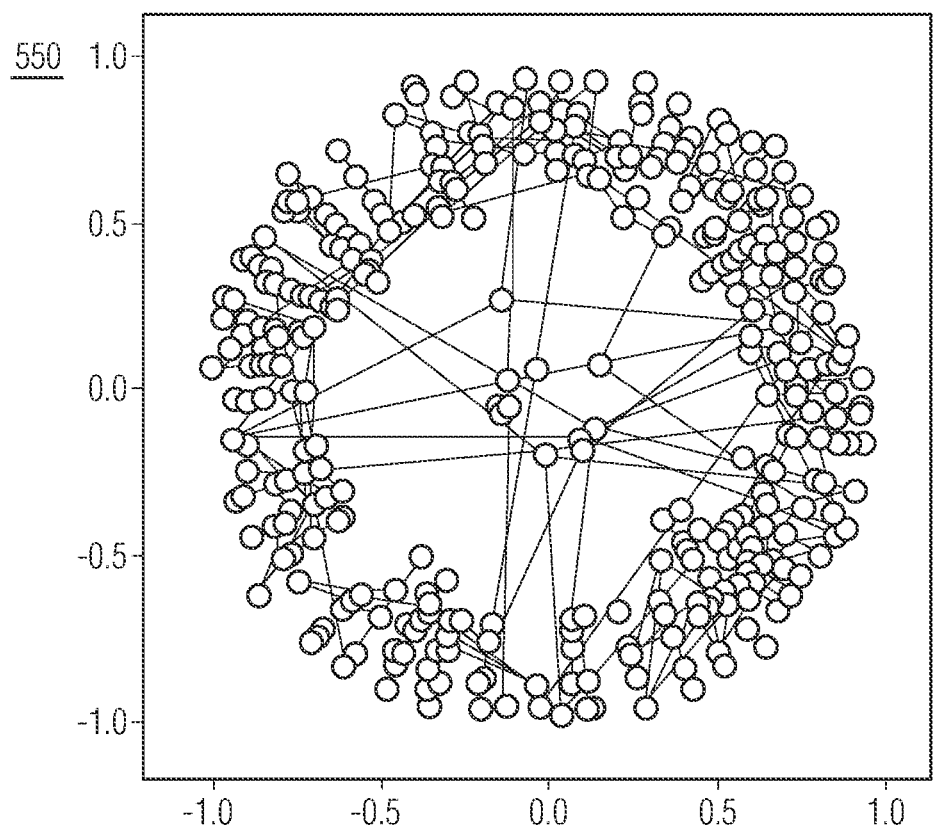
FIG. 5B is a block diagram illustrating a subgraph-based representation of target wells and their offset wells, according to example embodiments.

FIG. 5B is a block diagram illustrating a subgraph-based representation 550 of target wells and their offset wells, according to example embodiments. Graph based representation 550 may represent a sub-graph of graph-based representation 500.

Figure 5C:
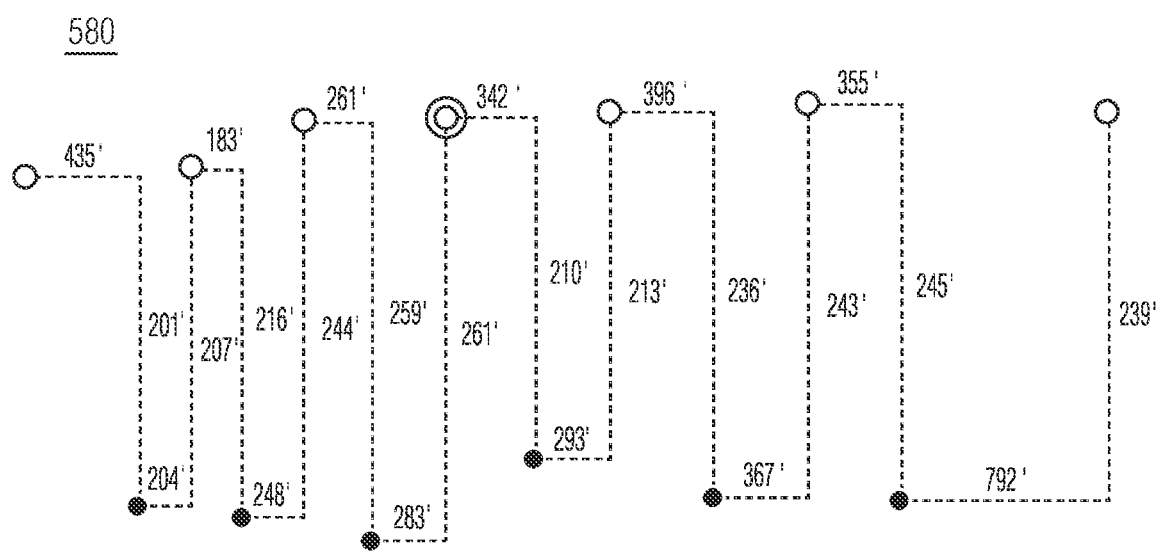
FIG. 5C is a block diagram illustrating a gun-barrel view of neighboring wells of a target well, according to example embodiments.

FIG. 5C is a block diagram 580 illustrating a gun-barrel view of neighboring wells of a target well, according to example embodiments. Block diagram 580 may illustrate the relationship between a target well and each of its neighboring wells. For example, block diagram 580 may illustrate spacing information between the target well and each of its neighboring wells. This view aids well interference prediction agent 116 in breaking a tie when two neighboring wells may be completed near or at the same time, and reside in the same zone of the parent well.

Figure 6:
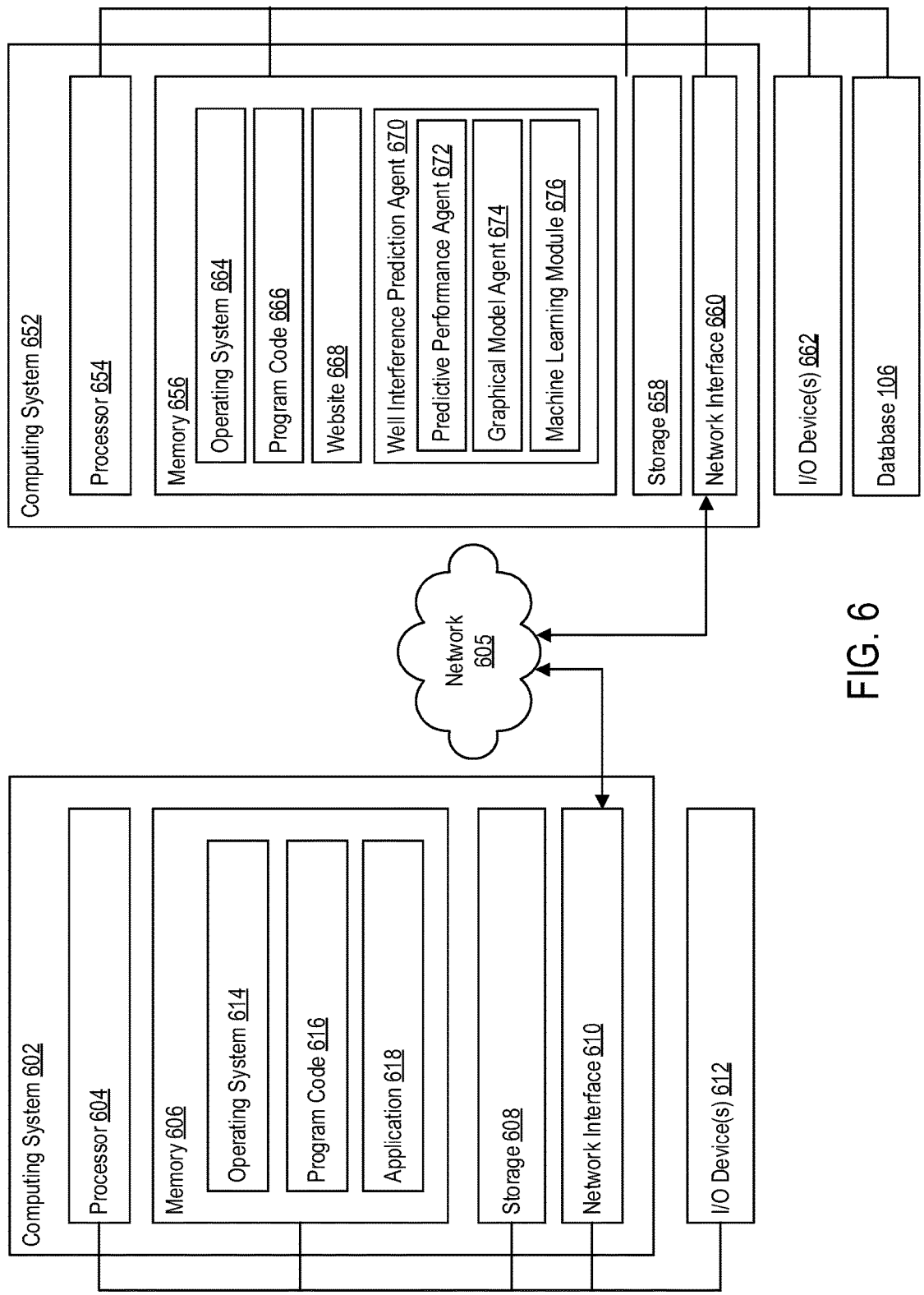
FIG. 6 is a block diagram illustrating an exemplary computing environment, according to one embodiment.

FIG. 6 illustrates a computing environment 600, according to one embodiment. Computing environment 600 includes computing system 602 and computing system 652 communicating over network 605. Computing system 602 may be representative of client device 102. Computing system 652 may be representative of management entity 104.

Computing system 602 may include processor 604, memory 606, storage 608, and network interface 610. In some embodiments, computing system 602 may be coupled to one or more I/O devices 612 (e.g., keyboard, mouse, monitor, etc.).

Processor 604 retrieves one executes program code 616 (i.e., programming instructions) stored in memory 606, as well as stores and retrieves application data. Processor 604 may be representative of a single processor, multiple processors, a single processor having multiple processing cores, and the like. Network interface 610 may be any type of network communications enabling computing system 602 to communicate externally via network 605. For example, network interface 610 may allow computing system 602 to communicate with computing system 652.

Storage 608 may be, for example, a disk storage device. Although shown as a single unit, storage 608 may be a combination of fixed and/or removable storage devices, such as fixed disk drives, removable memory cards, optical storage, network attached storage (NAS), storage area network (SAN), and the like.

Memory 606 may include application 618, operating system 614, and program code 616. Program code 616 may be accessed by processor 604 for processing (i.e., executing program instructions). Program code 616 may include, for example, executable instructions configured to perform steps discussed above in conjunction with FIGS. 2-4. For example, program code 616 may include executable instructions for communicating with computer system 652 to display one or more pages of website 668. Application 618 may provide access to functionality of computing system 652. For example, application 618 may provide access to well interference prediction agent 116 executing on computing system 652, via a website 668, as well as functionality of website 668. The content that is displayed to a user of computing system 602 may be transmitted from computing system 652 to computing system 602, and subsequently processed by application 618 for display through a GUI of computing system 602.

Computing system 652 may include processor 654, memory 656, storage 658, and network interface 660. In some embodiments, computing system 652 may be coupled to one or more I/O devices 662. In some embodiments, computing system 652 may further be coupled to database 106.

Processor 654 retrieves one executes program code 666 (i.e., programming instructions) stored in memory 656 as well as stores and retrieves application data. Processor 654 may be representative of a single processor, multiple processors, a single processor having multiple processing cores, and the like. Network interface 660 may be any type of network communications enabling computing system 652 to communicate externally via network 605. For example, network interface 660 may allow computing system 652 to communicate with computing system 602.

Storage 658 may be, for example, a disk storage device. Although shown as a single unit, storage 658 may be a combination of fixed and/or removable storage devices, such as fixed disk drives, removable memory cards, optical storage, network attached storage (NAS), storage area network (SAN), and the like.

Memory 656 may include operating system 664, program code 666, website 668, and well interference prediction agent 670. Program code 666 may be accessed by processor 654 for processing (i.e., executing program instructions). Program code 666 may include, for example, executable instructions configured to perform steps discussed above in conjunction with FIGS. 2-4. Website 668 may be accessed by computing system 602. For example, website 668 may include content accessed by computing system 602 via web browser or application.

Well interference prediction agent 670 may be configured to predict interference for a given well based on an initial input provided by computing system 602. Well interference prediction agent 670 may include a predictive performance agent 672, a graphical model agent 674, and a machine learning module 676.

Predictive performance agent 672 may be configured to generate a metric to quantify well interference. Such metric may be used by machine learning module 676 to train, for example, a graph-based model to predict interference for a well. Predictive performance agent 118 may implement a shut-in period detection algorithm that utilizes anomaly detection techniques to identify a time period in which a target well is either shut-in or its production is impacted due to completion of offset wells. For each interference event, predictive performance agent 118 may retrieve performance data for the target well both before and after the interference event. In some embodiments, predictive performance agent 118 may retrieve performance data from a third party data source. In some embodiments, predictive performance agent 118 may retrieve performance data from database 106. Predictive performance agent 118 may use performance data to generate a short-term interference metric and a long-term interference metric.

Graphical model agent 674 may be configured to generate a graph-based model of an area containing a target well (e.g., the target well analyzed by performance prediction agent 118 when generating the interference metrics). Such graph-based model may illustrate the inter-well relationship among wells in the particular area. For example, graphical model agent 674 may abstract away detail information about neighboring wells for a target well with a summarized view that may be relevant to estimate interference. Graphical model agent 674 may determine whether two wells should be connected in a graph based on spacing information and time of completion information. In some embodiments, after graphical model agent 674 generates a model of a given area centered about the target well, graphical model agent 674 may translate the graphical model to a matrix-representation.

Machine learning module 676 may include a graph-based model. Machine learning module 676 may be configured to train the graph-based model to predict well interference based at least on the well design, completion and geological information of target well and offset well information. Once trained, graph-based model may be used by well interference prediction agent 670 to predict well interference based on information provided by computing system 602.

Figure 7:
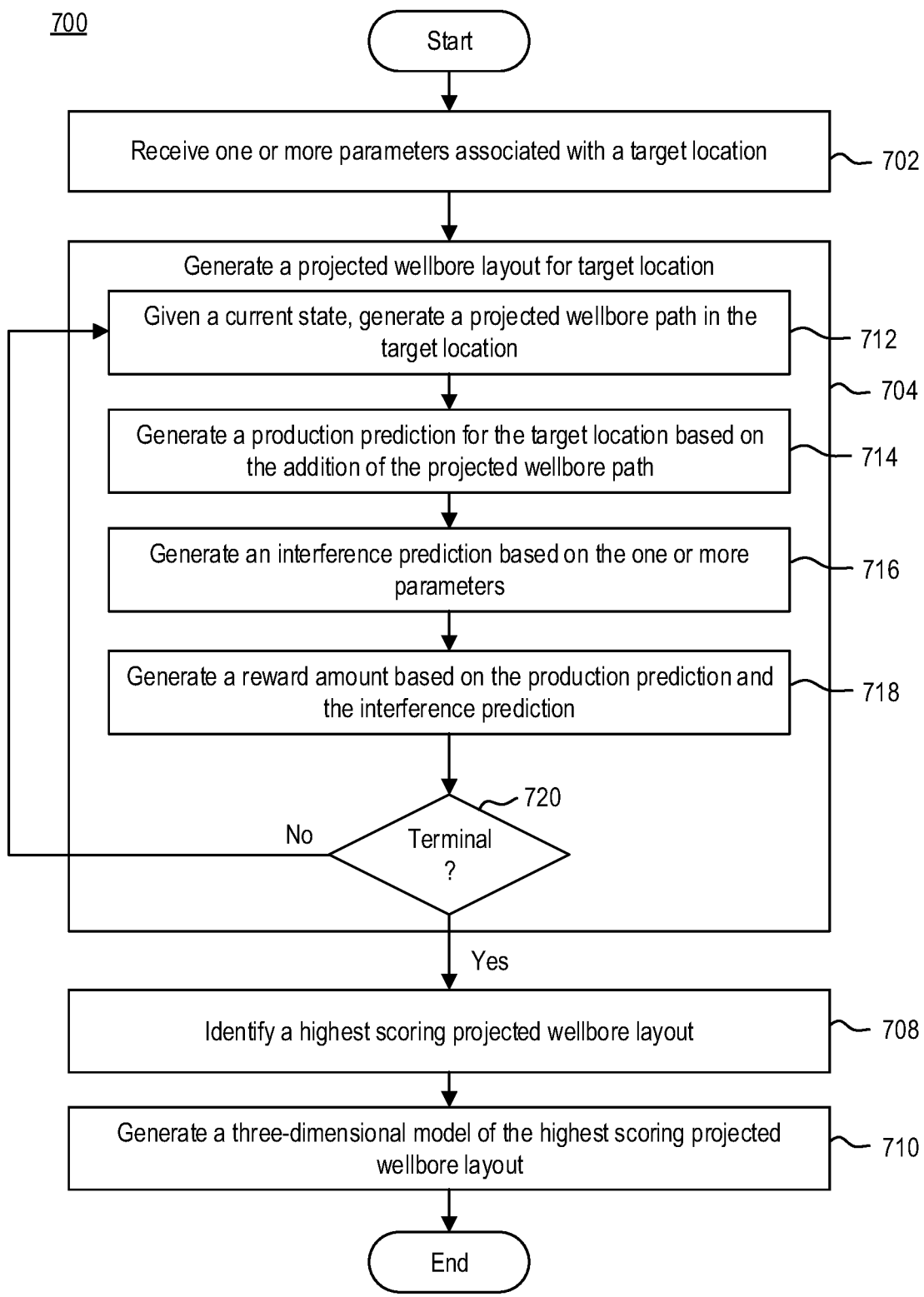
FIG. 7 is a flow diagram illustrating a method of generating a projected wellbore layout, according example embodiments.

FIG. 7 is a flow diagram illustrating a method 700 of generating a well placement optimization three-dimensional model, according to example embodiments. Method 700 may begin at step 702.

At step 702, organization computing system 104 may receive one or more parameters associated with a target location for one or more target wells. Well placement tool 160 may receive, for example, spacing information of one or more existing wellbores in the target location, geological information in the target location, operator of each wellbore (existing or to-be-generated), and performance of each existing wellbore in the target location.

At step 704, organization computing system 104 may generate a projected wellbore layout for the target location. For example, well placement tool 160 may use one or more machine learning techniques to analyze the one or more parameters to generate the projected wellbore layout. The projected wellbore layout may include one or more projected wellbore paths along with any pre-existing wellbores contained therein. Step 704 may include sub-steps X-Y.

At sub-step 712, given a current state of target location (e.g., during the first pass, this is an "initial state"), organization computing system 104 may generate a projected wellbore path for a first wellbore. For example, well placement tool 160 may generate the projected wellbore path for the first wellbore using one or more machine learning processes.

At sub-step 714, organization computing system 104 may generate a production prediction for the target location based on the addition of the generated projected wellbore path to the target location. For example, the production prediction may include such metrics such as, but not limited to, wellbore spacing, drainage volume of all wellbores, density of each wellbore, and the like.

At sub-step 716, organization computing system 104 may generate an interference prediction based on the extracted information. For example, well interference prediction agent 116 may input the normalized and formatted data set into a fully-trained graph model 124 such that graph model 124 may output the interference prediction. During a first round of information propagation, graph model 124 may generate the target well's relationship to its surrounding neighbors. During a second round of information propagation, graph model 124 may generate each surrounding well's relationship to their respective neighbors.

At sub-step 718, organization computing system 104 may generate a reward amount based on the generated production prediction and interference prediction. For example, well placement tool 160 may provide feedback based on the addition of the projected wellbore path to the target location. Such reward amount may be calculated based on a metric predefined by the user. For example, such reward amount may be calculated based on, by example, the estimate ultimate recovery (EUR) of the target location with the addition of the projected wellbore path, the estimated profit generated by the target location with the addition of the projected wellbore path, the estimated revenue generated of the target location with the addition of the projected wellbore path, net present value, or any desired metric.

At sub-step 720, organization computing system 104 may determine whether well placement tool 160 has reached a terminal state. A terminal state may be defined as a state in which the reward amount generated in step 716 amounts to zero. In other words, the addition of the projected wellbore path to the target location has no effect on the metric predefined by the user (i.e., EUR, estimated profit, estimated revenue, NPV, etc.).

If, at sub-step 720, organization computing system 104 determines that a terminal state has not been reached (i.e., the reward amount generated in step 718 is greater than zero), then method 700 reverts to step 712, and another projected wellbore path is generated an added to the projected wellbore layout.

If, however, at step 720, organization computing system 104 determines that the terminal state has been reached (i.e., the reward amount generated in step 718 is less than or equal to zero), then method 700 proceeds to step 708.

At step 708, well placement tool 160 may output the projected wellbore layout based on the one or more projected wellbore paths generated in step 706.

At step 710, well placement tool 760 may generate and output a three-dimensional model of the highest scoring projected wellbore layout.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

What is claimed:

1. A method, comprising:
  receiving, by a computing system from a client device, a request to generate an interference prediction for an interference event for a well, wherein the interference event is a well completion event corresponding to a target offset well and the interference prediction captures an effect of the well completion event off the target offset well on a production of the well, the request comprising one or more metrics associated with the well;
  analyzing, by the computing system via a predictive model, an effect of the interference event on the well, the analyzing comprising:

determining a relationship of the well to a first plurality of wells co-located with the well, and for each well of the first plurality of wells, generating a further relationship between the first plurality of wells and a second plurality of wells co-located with the first plurality of wells; and generating, by the computing system, an interference metric based on the one or more metrics associated with the well, the determined relationship of the well with the first plurality of wells co-located with the well, and the determined further relationship between the first plurality of wells and the second plurality of wells co-located with the first plurality of wells.

2. The method of claim 1, wherein determining the relationship of the well to the first plurality of wells co-located with the well comprises:

generating a graph-based representation of the well and the first plurality of wells, the generating comprising:
generating a node for the well and each of the first plurality of wells co-located with the well, and
connecting each node with a directed edge, wherein the directed edge represents a relationship between a starting node and an ending node.

3. The method of claim 2, wherein connecting each node with the directed edge comprises:

determining that the starting node and the ending node are connected based on spacing information between the starting node and the ending node.

4. The method of claim 2, wherein connecting each node with the directed edge comprises:

determining a first completion time for the starting node and a second completion time for the ending node.

5. The method of claim 2, wherein analyzing, by the computing system via the predictive model, the effect of the interference event on the well comprises:

converting the graph-based representation of the well into a matrix based representation.

6. The method of claim 1, further comprising:

generating, by the computing system, a web page or portal through which a user may view the interference metric.

7. The method of claim 1, wherein the interference metric comprises a predicted change in production of a well based on the interference event.

8. A non-transitory computer readable medium having one or more sequences of programming instructions stored thereon, which, when executed by a processor, causes a computing system to perform operations comprising:

receiving, by the computing system from a client device, a request to generate an interference prediction for an interference event for a well, wherein the interference event is a well completion event corresponding to a target offset well and the interference prediction captures an effect of the well completion event off the target offset well on a production of the well, the request comprising one or more metrics associated with the well;

analyzing, by the computing system via a predictive model, an effect of the interference event on the well, the analyzing comprising:

determining a relationship of the well to a first plurality of wells co-located with the well, and for each well of the first plurality of wells, generating a further relationship between the first plurality of wells and a second plurality of wells co-located with the first plurality of wells; and generating, by the computing system, an interference metric based on the one or more metrics associated with the well, the determined relationship of the well with the first plurality of wells co-located with the well, and the determined further relationship between the first plurality of wells and the second plurality of wells co-located with the first plurality of wells.

9. The non-transitory computer readable medium of claim 8, wherein determining the relationship of the well to the first plurality of wells co-located with the well comprises:

generating a graph-based representation of the well and the first plurality of wells, the generating comprising:
generating a node for the well and each of the first plurality of wells co-located with the well, and
connecting each node with a directed edge, wherein the directed edge represents a relationship between a starting node and an ending node.

10. The non-transitory computer readable medium of claim 9, wherein connecting each node with the directed edge comprises:

determining that the starting node and the ending node are connected based on spacing information between the starting node and the ending node.

11. The non-transitory computer readable medium of claim 9, wherein connecting each node with the directed edge comprises:

determining a first completion time for the starting node and a second completion time for the ending node.

12. The non-transitory computer readable medium of claim 9, wherein analyzing, by the computing system via the predictive model, the effect of the interference event on the well comprises:

converting the graph-based representation of the well into a matrix based representation.

13. The non-transitory computer readable medium of claim 8, further comprising:

generating, by the computing system, a web page or portal through which a user may view the interference metric.

14. The non-transitory computer readable medium of claim 8, wherein the interference metric comprises a predicted change in production of a well based on the interference event.

15. A system, comprising:

a processor; and a memory having programming instructions stored thereon, which, when executed by the processor, causes the system to perform operations comprising:

receiving, from a client device, a request to generate an interference prediction for an interference event for a well, wherein the interference event is a well completion event corresponding to a target offset well and the interference prediction captures an effect of the well completion event off the target offset well on a production of the well, the request comprising one or more metrics associated with the well;

analyzing, via a predictive model, an effect of the interference event on the well, the analyzing comprising:

determining a relationship of the well to a first plurality of wells co-located with the well, and for each well of the first plurality of wells, generating a further relationship between the first plurality of wells and a second plurality of wells co-located with the first plurality of wells; and generating an interference metric based on the one or more metrics associated with the well, the determined relationship of the well with the first plurality of wells co-located with the well, and the determined further relationship between the first plurality of wells and the second plurality of wells co-located with the first plurality of wells.

16. The system of claim 15, wherein determining the relationship of the well to the first plurality of wells co-located with the well comprises:
generating a graph-based representation of the well and the first plurality of wells, the generating comprising:
generating a node for the well and each of the first plurality of wells co-located with the well, and
connecting each node with a directed edge, wherein the directed edge represents a relationship between a starting node and an ending node.

17. The system of claim 16, wherein connecting each node with the directed edge comprises:
determining that the starting node and the ending node are connected based on spacing information between the starting node and the ending node.

18. The system of claim 16, wherein connecting each node with the directed edge comprises:
determining a first completion time for the starting node and a second completion time for the ending node.

19. The system of claim 16, wherein analyzing, via the predictive model, the effect of the interference event on the well comprises:
converting the graph-based representation of the well into a matrix based representation.

20. The system of claim 15, wherein the operations further comprise:
generating a web page or portal through which a user may view the interference metric.

* * * * *